United States Patent
Kitahama (10) Patent No.: US 8,234,009 B2
(45) Date of Patent: Jul. 31, 2012

(54) AUTONOMOUS MOBILE APPARATUS AND METHOD OF MOBILITY

(75) Inventor: Kenichi Kitahama, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 535 days.

(21) Appl. No.: 12/312,514

(22) PCT Filed: Jun. 13, 2008

(86) PCT No.: PCT/IB2008/002173
§ 371 (c)(1),
(2), (4) Date: May 14, 2009

(87) PCT Pub. No.: WO2008/152511
PCT Pub. Date: Dec. 18, 2008

(65) Prior Publication Data
US 2010/0063627 A1   Mar. 11, 2010

(30) Foreign Application Priority Data
Jun. 15, 2007 (JP) ................. 2007-159444

(51) Int. Cl.
*G06F 19/00* (2011.01)
*G05B 19/04* (2006.01)
*G05B 19/18* (2006.01)

(52) U.S. Cl. ................. 700/253; 700/245

(58) Field of Classification Search ........... 700/253
See application file for complete search history.

(56) References Cited

U.S. PATENT DOCUMENTS

| 5,911,767 | A   | * | 6/1999  | Garibotto et al. ........ 701/28 |
|-----------|-----|---|---------|----------------------------------|
| 6,173,215 | B1  | * | 1/2001  | Sarangapani .......... 700/255  |
| 6,539,284 | B2  | * | 3/2003  | Nourbakhsh et al. ... 700/245   |
| 6,760,647 | B2  | * | 7/2004  | Nourbakhsh et al. ... 700/245   |
| 6,917,855 | B2  | * | 7/2005  | Gonzalez-Banos et al. .. 700/245|
| 7,211,980 | B1  | * | 5/2007  | Bruemmer et al. ..... 318/587   |
| 7,587,260 | B2  | * | 9/2009  | Bruemmer et al. ..... 700/253   |
| 7,818,090 | B2  | * | 10/2010 | Okamoto ............. 700/253   |
| 2002/0161480 | A1 |   | 10/2002 | Kakutani et al.               |
| 2004/0073368 | A1 | * | 4/2004  | Gonzalez-Banos et al. .. 701/301 |
| 2004/0193323 | A1 | * | 9/2004  | Higaki et al. ........ 700/259 |
| 2005/0216126 | A1 |   | 9/2005  | Koselka et al.                |
| 2006/0106496 | A1 | * | 5/2006  | Okamoto ............. 700/253   |
| 2009/0024250 | A1 | * | 1/2009  | Oaki et al. ......... 700/245   |

FOREIGN PATENT DOCUMENTS

| JP | U-6-75005    | 10/1994 |
| JP | A-2001-287183 | 10/2001 |
| JP | A-2006-146491 | 6/2006  |
| JP | A-2007-102488 | 4/2007  |
| JP | A-2007-316922 | 12/2007 |

* cited by examiner

*Primary Examiner* — Khoi Tran
*Assistant Examiner* — Bhavesh V Amin
(74) *Attorney, Agent, or Firm* — Oliff & Berridge, PLC (57) ABSTRACT

When an autonomous mobile apparatus moves autonomously along near a master and there is an object in the surrounding environment recognized by a camera and a communication device and the like, a danger level detecting portion detects a danger level of the object to the master, and an actuator controlling portion and an electric motor move the autonomous mobile apparatus based on the danger level. As a result, the autonomous mobile apparatus moves autonomously along near the master, as well as detects the danger level to the master and moves based on the danger level. Accordingly, the autonomous mobile apparatus can move in a manner so as to ensure the safety of the master taking this danger level into account.

15 Claims, 10 Drawing Sheets

AUTONOMOUS MOBILE APPARATUS AND METHOD OF MOBILITY

BACKGROUND OF THE INVENTION

1. Field of the Invention

The invention relates to an autonomous mobile apparatus that moves autonomously along near a specified person, as well as a method of that mobility.

2. Description of the Related Art

Japanese Patent Application Publication No. 2001-287183 (JP-A-2001-287183) proposes an automated transport robot for automatically transporting a product to a destination. This automated transport robot places a product in a storage compartment of the robot, locks a lock portion, and moves to a specified target location. When it is confirmed that the robot has reached the specified target location and the registered handler has been confirmed, the lock portion unlocks so that the registered handler can reliably take the product that is in the storage compartment of the robot out at the specified target location.

However, although this automated transport robot is able to automatically transport a product to a destination, no consideration is given to having it move along near a person so as to ensure the safety of that person.

SUMMARY OF THE INVENTION

This invention thus provides an autonomous mobile apparatus that autonomously moves along near a specified person in a manner so as to ensure the safety of that person, as well as a method of mobility of that apparatus.

A first aspect of the invention relates to an autonomous mobile apparatus that moves autonomously along near a specified person. This autonomous mobile apparatus includes surrounding environment recognizing means for recognizing the specified person and a surrounding environment of the specified person; danger level detecting means for, when there is an object in the surrounding environment recognized by the surrounding environment recognizing means, detecting a danger level of the object with respect to the specified person; and moving means for moving the autonomous mobile apparatus based on the danger level detected by the danger level detecting means.

According to this structure, the autonomous mobile apparatus can move in a manner so as to ensure the safety of the specified person, taking into account the danger level of the object with respect to the specified person.

Also, the autonomous mobile apparatus according to this aspect may also include danger location predicting means for, when there is an object in the surrounding environment recognized by the surrounding environment recognizing means, predicting a danger location where there is a possibility of the object and the specified person coming into contact with one another. Furthermore, the moving means may move the autonomous mobile apparatus based on the danger level and the danger location predicted by the danger location predicting means.

According to this structure, the autonomous mobile apparatus can move in a manner so as to more reliably ensure the safety of the specified person, taking into account the danger location.

Also, the autonomous mobile apparatus having the forgoing structure may also include averaging means for calculating an average of the danger location and an average of the danger level of the object. Further, the moving means may move the autonomous mobile apparatus based on the average of the danger location and the average of the danger level.

According to this structure, the autonomous mobile apparatus can move in a manner so as to ensure the safety of the specified person, taking into account the average of the danger location and the average of the danger level.

In the autonomous mobile apparatus having the forgoing structure, the average of the danger location may be a weighted average of the danger location, in which the danger level is the weight.

In the autonomous mobile apparatus having the forgoing structure, when there are a plurality of objects in the surrounding environment recognized by the surrounding environment recognizing means, the averaging means may calculate the average of the danger location based on the danger level of each of the plurality of objects and the danger location of each of the plurality of objects.

Also, in the autonomous mobile apparatus having the forgoing structure, the moving means may move the autonomous mobile apparatus based on a relative position of the autonomous mobile apparatus with respect to the specified person, the relative position being set in advance as a home position.

According to this structure, the autonomous mobile apparatus can move in a manner so as to ensure the safety of the specified person while moving autonomously along near the specified person, with a preset relative position being the home position.

Also, in the autonomous mobile apparatus having the forgoing structure, the moving means may move the autonomous mobile apparatus closer to the home position the lower the danger level of the object detected by the danger level detecting means is.

According to this structure, the autonomous mobile apparatus can move while maintaining a position that is closer to the relative position that is set as the home position, when the danger level to the specified person is lower.

Also, in the autonomous mobile apparatus having the forgoing structure, the surrounding environment recognizing means may recognize by estimation the area of visibility of the specified person, and the moving means may move the autonomous mobile apparatus based on the area of visibility of the specified person recognized by the surrounding environment recognizing means and the danger level of the object with respect to the specified person, which is detected by the danger level detecting means.

According to this structure, the autonomous mobile apparatus can move in a manner so as to ensure the safety of the specified person, taking into account the area of visibility of the specified person and the danger level of the object.

Also, in the autonomous mobile apparatus having the forgoing structure, the moving means may move the autonomous mobile apparatus between the specified person and an object for which the danger level detected by the danger level detecting means is higher than a predetermined danger level.

According to this structure, the autonomous mobile apparatus can move in a manner so as to ensure the safety of the specified person by preventing contact between the specified person and an object for which the danger level is higher than a predetermined danger level.

Also, in the autonomous mobile apparatus having the forgoing structure, the surrounding environment recognizing means may recognize by estimation the time to contact between the object and the specified person, and the danger level detecting means may detect the danger level based on the time to contact recognized by the surrounding environment recognizing means.

According to this structure, the autonomous mobile apparatus can move in a manner so as to ensure the safety of the specified person, taking into account the estimated time to contact between the object and the specified person.

In the autonomous mobile apparatus having the foregoing structure, the moving means may move the autonomous mobile apparatus along a virtual line that connects the specified person with the average of the danger location when the average of the danger level is equal to or greater than a preset first numerical value.

In the autonomous mobile apparatus having the foregoing structure, the moving means may i) move the autonomous mobile apparatus closer to the home position the lower the average of the danger level is when the average of the danger level is less than the preset first numerical value, ii) move the autonomous mobile apparatus within the area of visibility of the specified person, along the virtual line that connects the specified person with the average of the danger location when the average of the danger level is equal to or greater than the preset first numerical value but less than a second numerical value that is set larger than the first numerical value in advance, and iii) move the autonomous mobile apparatus closer to the specified person than the area of visibility of the specified person when the average of the danger level is equal to or greater than the second numerical value.

In the autonomous mobile apparatus having the foregoing structure, the surrounding environment recognizing means may include a camera that captures an image of the specified person and the surrounding environment of the specified person, and recognize the specified person and the surrounding environment of the specified person based on the captured image. Moreover, the danger level detecting means may detect the danger level of the object based on the captured image.

In the autonomous mobile apparatus having the foregoing structure, the danger location predicting means may predict the danger location where there is a possibility of the object and the specified person coming into contact with one another, based on the captured image.

A second aspect of the invention relates to a method of mobility of an autonomous mobile apparatus that moves autonomously along near a specified person. This method of mobility includes recognizing the specified person and a surrounding environment of the specified person; detecting, when there are a plurality of objects in the recognized surrounding environment, a danger level of each of the plurality of objects with respect to the specified person; predicting a danger location where there is a possibility of each of the plurality of objects and the specified person coming into contact with one another; and moving based on the danger level and the danger location.

The method of mobility according to the second aspect may also include moving based on a weighted average of the danger location, in which the danger level is the weight.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, example embodiments of the invention will be described in detail with reference to the accompanying drawings. To facilitate understanding, like constituent elements in the drawings will to the greatest extent possible be denoted by like reference numerals and redundant descriptions will be omitted.

Figure 1:
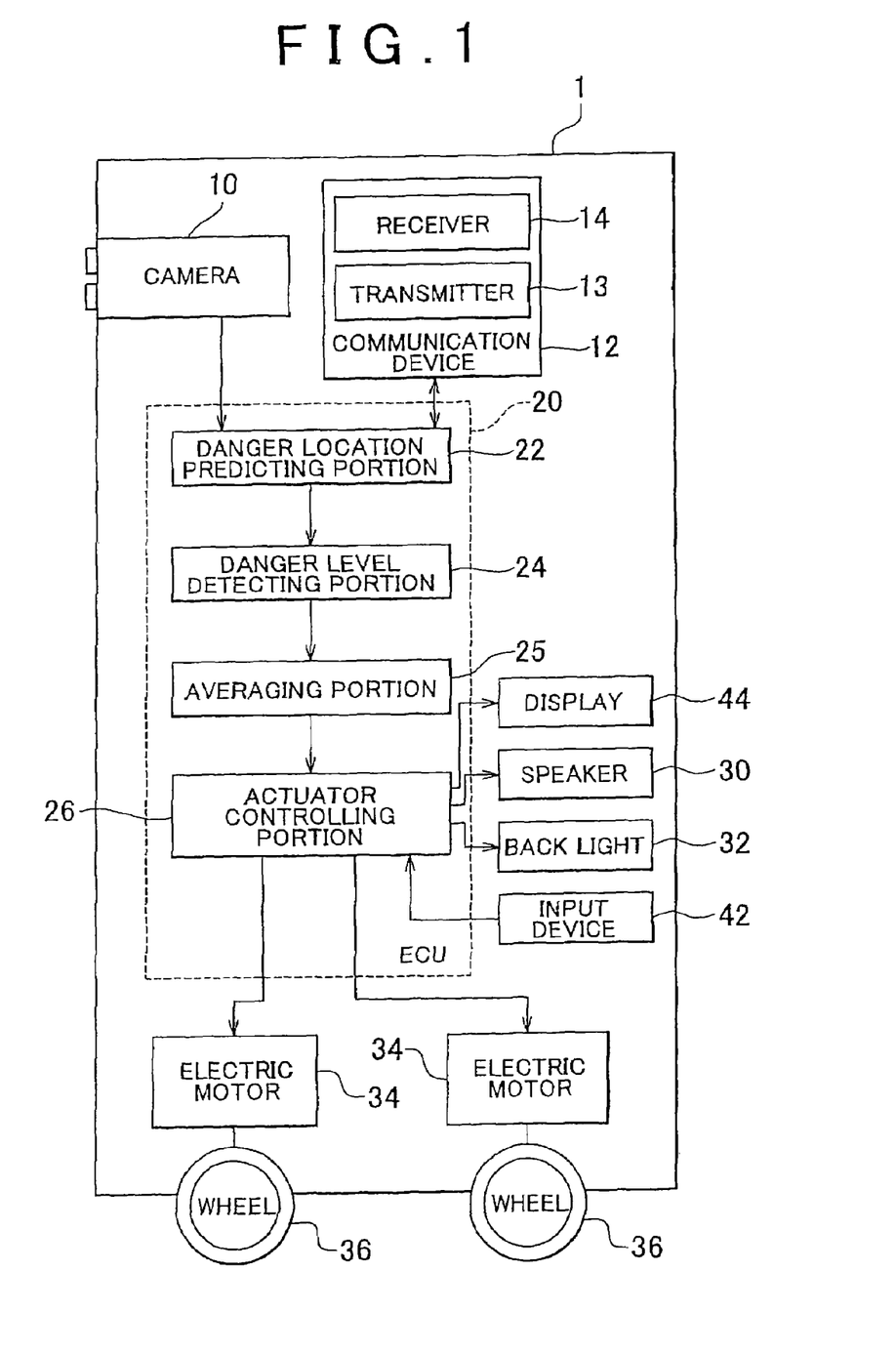
FIG. 1 is a block diagram of the structure of an autonomous mobile apparatus according to one example embodiment of the invention.

First, the structure of an autonomous mobile apparatus 1 according to an example embodiment of the invention will be described with reference to FIG. 1. FIG. 1 is a block diagram showing the structure of the autonomous mobile apparatus 1. The autonomous mobile apparatus 1 moves autonomously along near a specified person using this autonomous mobile apparatus 1 (hereinafter, this specified person will simply be referred to as "master"), in a manner so as to follow or lead the master. Also, the autonomous mobile apparatus 1 recognizes the master and the surrounding environment through information obtained by a camera 10 and a communication device 12 and the like. In addition, when there is an object in the recognized surrounding environment, the autonomous mobile apparatus 1 detects the level of danger that the object poses to the master. Based on the detected danger level, the autonomous mobile apparatus 1 moves along near the master in a manner so as to prevent the master from entering a dangerous area where the master is likely to come into contact with the object. Incidentally, when it is determined that there is a danger of the object and the master coming into contact with one another, the autonomous mobile apparatus 1 alerts the master and others in the vicinity by, for example, issuing a warning sound from a speaker 30 and a flashing a back light 32, while driving the wheels 36 to move in between the object and the master.

The camera 10 includes a pair of CCD cameras that capture images of the master and the surrounding environment, and an image processing portion that recognizes the master as well as obstacles and road signs and the like in the vicinity of the master (i.e., the surrounding environment) by processing the captured images. This image processing portion recognizes the master and the obstacles and road signs and the like in the vicinity by extracting (i.e., selecting) them through edge extraction or pattern recognition processing or the like. Accordingly, the image processing portion can recognize whether there is an object in the surrounding environment. The image processing portion also obtains the distance and lateral displacement with respect to an object by triangulation based on the change in the position of the master or the like with respect to the object in the left and right captured images, and obtains the relative speeds of the object and the master from the amount of change in the distance obtained for each data frame. As a result, the image processing portion is also able to estimate the time until contact between the object and the master. The camera 10 and an electronic control unit (hereinafter simply referred to as "ECU") 20, which will be described later, are connected together by a communication line. Information obtained by the camera 10 is transmitted to the ECU 20 via this communication line.

The communication device 12 includes a transmitter 13 and a receiver 14. The communication device 12 sends and receives information to and from an infrastructure that includes, for example, other autonomous mobile apparatuses, vehicles, traffic lights at intersections, and road-side cameras and radar and the like in the vicinity of the autonomous mobile apparatus 1. The transmitter 13 transmits information about the location of the master, the visual field height of the master, the area of visibility and the angle of visibility of the master as estimated by the camera 10, and the direction, speed, and acceleration of movement of the master, and the like, to vehicles traveling in the vicinity, other autonomous mobile apparatuses, and the like.

Meanwhile, the receiver 14 receives various information such as i) information about the movement of the master sent from a sensing (i.e., detecting) device such as an acceleration sensor or gyro carried by the master, ii) information about the positions of other pedestrians with other autonomous mobile apparatuses, the visual field height of the master, the area of visibility and the angle of visibility of the master as estimated by the camera 10, and the direction, speed, and acceleration of movement of the master, and the like, sent from the other autonomous mobile apparatuses, iii) information about the positions, direction and speed of travel, and the operating state and the like of traveling vehicles sent from vehicles traveling in the vicinity, iv) information about the positions of stopped vehicles sent from vehicles that are stopped in the vicinity, and v) information about the traffic state such as the state (e.g., red, yellow, green) of traffic lights and the like sent from the infrastructure described above. Incidentally, the communication device 12 may be set to send and receive information within a radius of approximately 100 meters, for example.

The communication device 12 and the ECU 20 together are connected by a communication line and are thus able to exchange information with each other. The information to be transmitted that is generated by the ECU 20 is transmitted from the ECU 20 to the transmitter 13 via this communication line. Meanwhile, the various information regarding the surrounding environment that is received by the receiver 14 is transmitted to the ECU 20 via this communication line.

In this way, in this example embodiment, the master and the environment around the master are recognized by the camera 10 and the communication device 12 and the like. More specifically, the autonomous mobile apparatus 1 recognizes the location of the master, the visual field height of the master, the area of visibility and the angle of visibility of the master, and the direction, speed, and acceleration of movement of the master, as well as the surrounding environment such as other pedestrians, the estimated time to contact between the master and an object, the location, the shape, the direction, speed, and acceleration of movement, and the operating state of bicycles and vehicles and the like, the position and shape of obstacles such as stopped vehicles, utility poles, and fallen objects, the traffic state such as the state (e.g., red, yellow, green) of traffic lights and road signs and the like. The autonomous mobile apparatus 1 also recognizes attributes related to, for example, the type, mass, weight, material, and the like of an object. Examples of attributes related to the type of object include the classification, e.g., oversized (i.e., large) vehicle, compact vehicle, two-wheel vehicle, bicycle, and the like. Examples of attributes related to mass and weight include whether the object is heavy or light, and examples of attributes related to material include whether the surface is soft or hard. That is, the camera 10 and the communication device 12 function as surrounding environment recognizing means.

Recognition of the master is made possible by, for example, placing personal ID information indicative of the master in communication information that is communicated between the master and the autonomous mobile apparatus 1, or by determining whether the shape and design of the clothes worn by the person captured by the camera 1 match the shape and design of the clothes of the master that are stored in the ECU 20 in advance. Furthermore, these methods may also be used in combination with recognition technology such as fingerprint recognition or iris recognition.

The ECU 20 includes a microprocessor that performs calculations, ROM in which programs and the like for executing various processes (i.e., routines) in the microprocessor are stored, RAM in which various data such as the calculation results are stored, and backup RAM in which the stored data is retained by a 12 volt battery, and the like. According to this structure, the ECU 20 includes a danger location predicting portion 22, a danger level detecting portion 24, an averaging portion 25, and an actuator controlling portion 26. The actuator controlling portion 26 drives the speaker 30, the back light 32, an electric motor 34, and a display 44, and the like. Also, the master can set a home position, which will be described later, in advance by inputting it from an input device 42, which serves as inputting means, to the actuator controlling portion 26.

First, when it is determined by the camera 10, the communication device 12, and the ECU 20 that there is an object in the surrounding environment that is recognized by the camera 10 and the communication device 12 and the like, the danger level detecting portion 24 detects the level of danger that the object poses to the master. The danger level of the object refers to the degree to which the master would be harmed by the object if the master were to come into contact with it. The danger level of the object is detected based on, for example, the attributes related to the type, mass, weight, and material and the like of the object.

Also, the danger location predicting portion 22 predicts the location of the danger when it is determined by the camera 10, the communication device 12, and the ECU 20 that there is an object in the surrounding environment that is recognized by the camera 10 and the communication device 12 and the like. The danger location refers to the location or position where there is a possibility of a traffic accident or the like occurring as a result of the object and the master coming into contact with one another. The danger location is predicted by, for example, the danger location predicting portion 22 from the distance between the master and the object and the relative speed at which the object is moving with respect to the master, as will be described later.

Also, the averaging portion 25 calculates the average danger location and the average danger level. The average danger location is the weighted average of the danger locations of various objects, using the danger level detected for each object by the danger level detecting portion 24 as the weight of the danger location predicted for each object by the danger location predicting portion 22. Also, the average danger level is the average of the danger levels of various objects detected individually by the danger level detecting portion 24. The methods used by the averaging portion 25 to calculate the average danger location and the average danger level will be described later.

That is, the danger level detecting portion 24 that forms part of the ECU 20 functions as danger level detecting means, the danger location predicting portion 22 functions as danger location predicting means, the averaging portion 25 functions as averaging means, and the actuator controlling portion 26 and the electric motor 34 function as moving means.

Also, the actuator controlling portion 26 moves the autonomous mobile apparatus 1 so as to prevent the master from entering an area where there is a danger of he or she coming into contact with the object (hereinafter this area will be referred to as the "dangerous area") based on the danger location predicted by the danger location predicting portion 22 and the danger level detected by the danger level detecting portion 24. As a result, the autonomous mobile apparatus 1 can move to ensure the safety of the master taking the danger location and the danger level into account. Moreover, the actuator controlling portion 26 may also move the autonomous mobile apparatus 1 based on the average danger location and the average danger level calculated by the averaging portion 25. As a result, the autonomous mobile apparatus 1 can move to ensure the safety of the master taking all recognized objects into account.

Furthermore, the actuator controlling portion 26 may also move the autonomous mobile apparatus 1 based on the relative position of the autonomous mobile apparatus 1 with respect to the master, which is set in advance as the "home position," as will be described later. This home position is input beforehand by the master using the input device 42 described above. The information related to the input home position is then transmitted to the actuator controlling portion 26. As a result, during normal operation, the autonomous mobile apparatus 1 can move along in a relative position to the master, which is set beforehand as the home position. Further, the actuator controlling portion 26 may move the autonomous mobile apparatus 1 closer to the home position the lower the danger level of the object detected by the danger level detecting portion 24 is. Accordingly, when there is no immediate danger to the master, the autonomous mobile apparatus 1 can move along in a nearby position according to the relative position set beforehand as the home position. That is, when there is no immediate danger to the master, the autonomous mobile apparatus 1 can move along in a nearby position according to the relative position that is preferred by the master.

Moreover, the actuator controlling portion 26 may also move the autonomous mobile apparatus 1 based on the area of visibility and the angle of visibility of the master, as will be described later. The area of visibility and the angle of visibility of the master are recognized by being estimated by the camera 10 and the like. As a result, the autonomous mobile apparatus 1 can ensure the safety of the master by moving outside of the area of visibility or outside of the angle of visibility of the master to prevent contact between the master and an object unnoticed by the master, for example. Moreover, the actuator controlling portion 26 may also move the autonomous mobile apparatus 1 between the master and an object for which the danger level detected by the danger level detecting portion 24 is higher than a predetermined danger level. Accordingly, the safety of the master can be ensured by the autonomous mobile apparatus 1 moving to prevent contact between the object and the master.

The speaker 30 is connected to the ECU 20 and draws the attention of the master and others in the vicinity by issuing a warning sound or voiced information or the like in response to a control signal output from the actuator controlling portion 26. The back light 32 is also connected to the ECU 20 and is driven by the actuator controlling portion 26 so as to draw the attention of the master and others in the vicinity by lighting up in different colors depending on the danger level, for example. Further, the electric motor 34 is also connected to the ECU 20 and is driven by the actuator controlling portion 26 so as to move the autonomous mobile apparatus 1 by rotating a wheel 36 that is attached to the electric motor 34. Further, the input device 42, which is a button or touch panel, is connected to the ECU 20 such that the master can set the home position, which will be described later, by inputting it to ECU 20.

Figure 2:
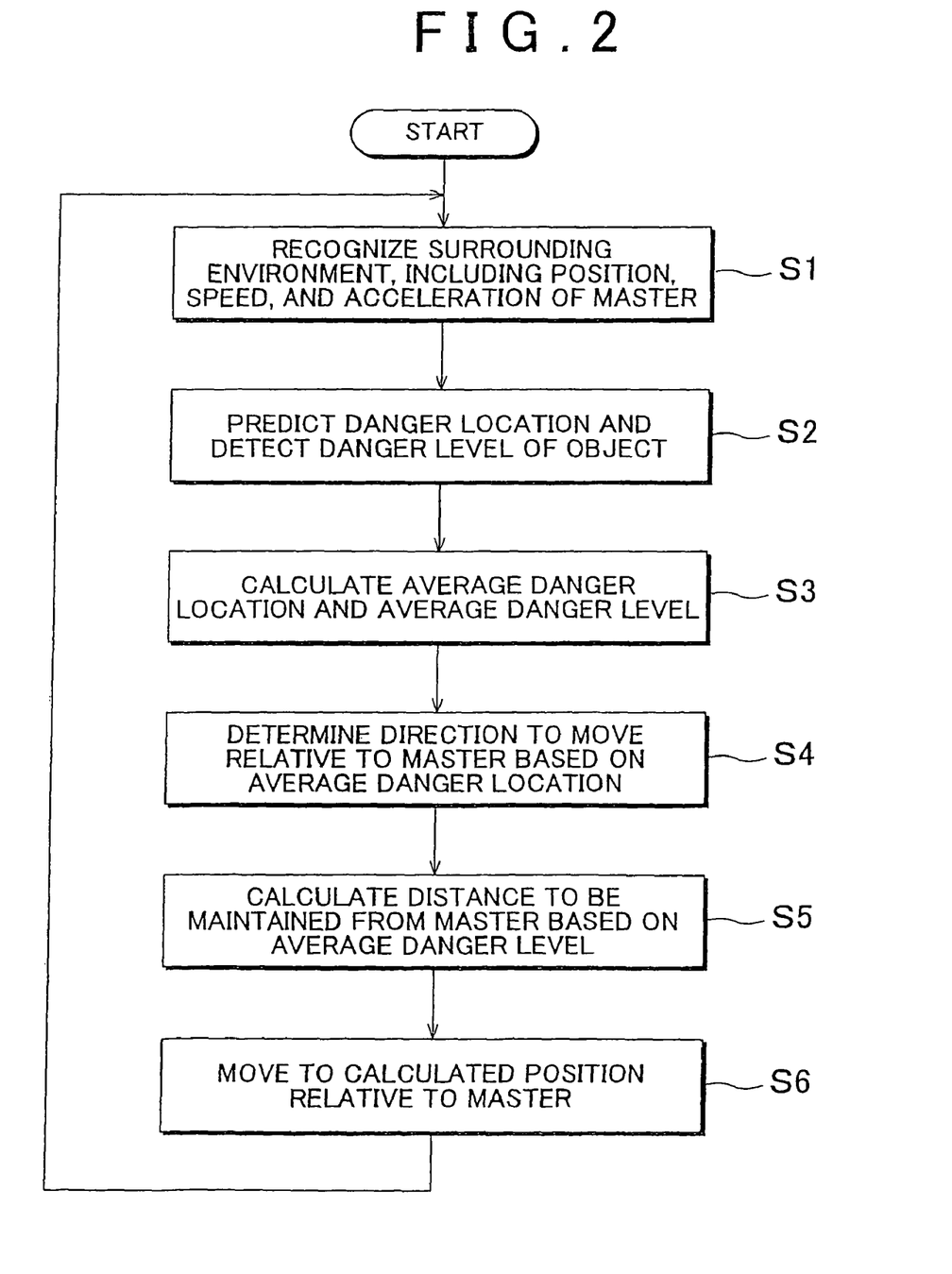
FIG. 2 is a flowchart illustrating a routine that is executed in the autonomous mobile apparatus according to the example embodiment.

Next, the operational flow in the autonomous mobile apparatus 1 that moves so as to ensure the safety of the master will be described with reference to FIG. 2. FIG. 2 is a flowchart illustrating a routine that is performed in the autonomous mobile apparatus 1. The routine shown in the flowchart in FIG. 2 is repeatedly executed mainly by the ECU 20 at predetermined intervals between the time processing starts after the power of the autonomous mobile apparatus 1 is turned on and the time the power of the autonomous mobile apparatus 1 is turned off.

First, in step S1, the state of the master, including the position, speed of movement, acceleration, and the like of the master together with the surrounding environment are recognized by the camera 10 and the communication device 12 and the like. Then the process proceeds on to step S2.

In step S2, if there is an object or objects in the surrounding environment recognized in step S1, the danger location predicting portion 22 predicts the danger location of each object, and the danger level detecting portion 24 calculates the danger level for each object. Then the process proceeds on to step S3.

In step S3, the averaging portion 25 calculates the average danger location, which is the average of the danger locations detected in step S2, as well as the average danger level which is the average of the danger levels calculated in step S2. Then the process proceeds on to step S4.

In step S4, the ECU 20 determines the relative direction of movement of the autonomous mobile apparatus 1 with respect to the master based on the average danger location and the average danger level calculated in step S3. The method for determining the relative direction of movement with respect to the master will be described later. Then the process proceeds on to step S5.

In step S5, the ECU 20 calculates the distance to be maintained between the autonomous mobile apparatus 1 and the master based on the average danger level calculated by the step S3. The method for calculating this distance will be described later. Then the process proceeds on to step S6.

In step S6, the actuator controlling portion 26 moves the autonomous mobile apparatus 1 to the relative position with respect to the master based on the direction of movement calculated in step S4 and the distance to the master calculated in step S5. The movement that is based on the direction of movement and the distance will be described later. Then the process returns to step S1.

Figure 3:
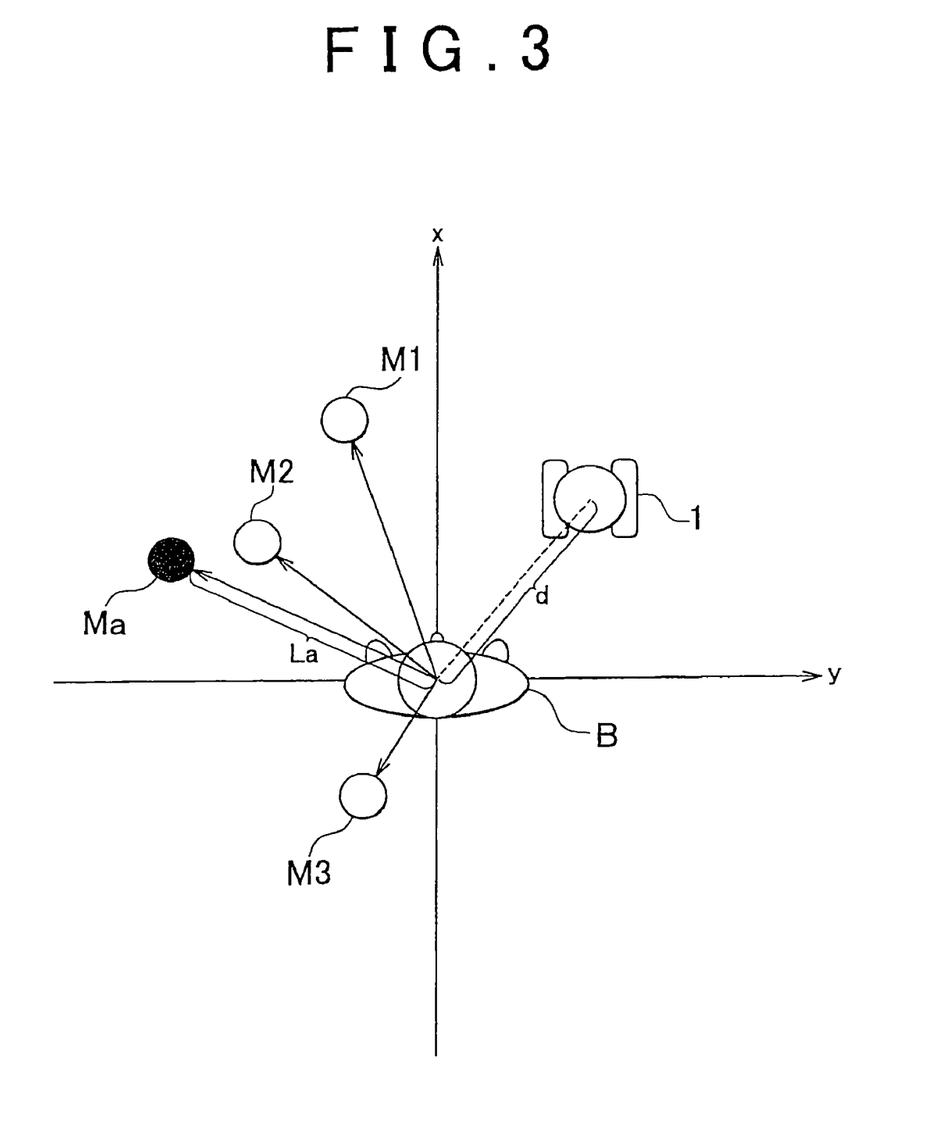
FIG. 3 is a view showing a method for calculating an average danger location and an average danger level according to the example embodiment.

Next, an example method for calculating the average danger location and the average danger level will be described with reference to FIG. 3. In this example, the autonomous mobile apparatus 1 is in the home position with respect to the master B. Also, there are three objects M1, M2, and M3, for example, near the master B and the camera 10 and the communication device 12 and the like recognize these objects. The danger location where there is a possibility that the object M1 and the master B will contact one another, i.e., the relative position of the object M1 based on the master B, is expressed as $(x_1, y_1)$. Incidentally, the plane on which the master B moves is a virtual x-y plane, with the x-axis being in the direction extending straight out in front of the master B (i.e., in the direction in which the master B is facing) and the y-axis being in the direction extending straight out to the sides of the master B. Similarly, the relative position of the object M2 based on the master B is expressed as $(x_2, y_2)$, and the relative position of the object M3 based on the master B is expressed as $(x_3, y_3)$. Also, the danger levels of the objects M1, M2, and M3 detected by the danger level detecting portion 24 are expressed as $D_1$, $D_2$, and $D_3$, respectively.

Here, the autonomous mobile apparatus 1 assumes that there is a virtual object Ma with the average danger level Da at the average danger location Pa, and autonomously moves accordingly. The virtual object Ma is an object that is assumed taking into account the danger locations and danger levels of all given objects near the master B. The average danger level Da of the danger levels $D_1$ to $D_3$ detected by the danger level detecting portion 24 can be obtained according to Expression (1) below. Normally, 1 is substituted for i and the total number of objects (in this case 3) is substituted for N. Also, when the average danger location Pa calculated by the averaging portion 25 is expressed as $(x_a, y_a)$, $(x_a, y_a)$ can be obtained according to Expression (2) below. Further, the average distance La between the master B and the objects, which is used when the ECU 20 calculates the distance d in step S5, can be obtained according to Expression (3) below.

$$D_a = \frac{\sum_i^N D_i}{N} \quad (1)$$

$$(x_a, y_a) = \frac{\sum_i^N D_i \times (x_i, y_i)}{\sum_i^N D_i} \quad (2)$$

$$L_a = \sqrt{x_a^2 + y_a^2} \quad (3)$$

Figure 4:
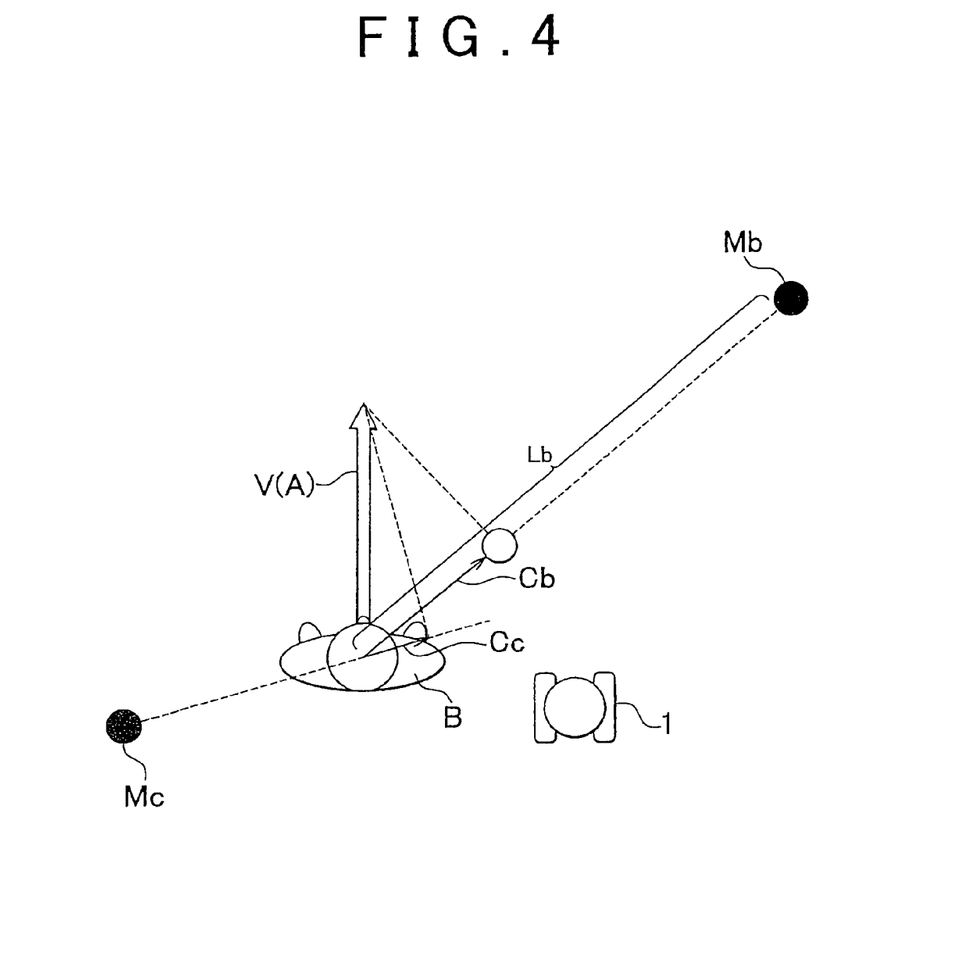
FIG. 4 is a view showing a method for calculating the average danger location and the average danger level taking into account the movement of the master according to the example embodiment.

Next, an example method for calculating the average danger location and the average danger level that takes the movement of the master B into account will be described with reference to FIG. 4. In this example, the autonomous mobile apparatus 1 is in the relative home position with respect to the master B who is moving or stationary. Also, it is assumed that there is a virtual object Mb in the relative vicinity of the master B. Similar to the virtual object Ma, the virtual object Mb is an object that is assumed taking into account the danger location and danger level of all the given objects, none of which are shown, near the master B. In this example, the master B is moving in the direction of the white arrow shown in FIG. 4. The velocity vector (or acceleration vector) of the relative movement of the master B with respect to the virtual object Mb is V (or A in the case of the acceleration vector).

A resolution component Cb that is resolution of the velocity vector V (or the acceleration vector A) in the direction of the virtual object Mb from the viewpoint of the master B is used when calculating the average danger location that takes into account the relative movement of the master B with respect to the virtual object Mb. When the virtual object Mb is in the relative position shown in FIG. 4 with respect to the master B, the resolution component Cb of the direction of the virtual object Mb is in the direction approaching the object Mb. On the other hand, when there is a virtual object Mc in the relative position shown in FIG. 4 with respect to the master B, the resolution component Cc of the direction of the virtual object Mc is in a direction away from the object Mc.

In this case, the camera 10 and the communication device 12 and the like estimate the time until contact between the virtual object Mb and the master B using the resolution component Cb of the velocity vector V (or the acceleration vector A). For example, if the resolution component Cb of the velocity vector of the master B is constant, then the time until contact is the quotient of the average distance Lb to the objects divided by the resolution component Cb of this velocity vector V. Further, the danger level detecting portion 24 may also detect the average danger level of the virtual object Mb based on the calculated time until contact. For example, the danger level detecting portion 24 may calculate a proportionately higher average danger level as the calculated time until impact becomes shorter.

Next, a method for calculating the distance d that the autonomous mobile apparatus 1 maintains between it and the master B will be described with reference to FIG. 5. The distance d is uniquely determined by the average danger level Da so as to become shorter as the average danger level Da becomes higher. That is, as the danger level to the master B increases, the autonomous mobile apparatus 1 alerts the master B by reducing the distance between itself and the master B, while moving to ensure the safety of the master B.

More specifically, when the average danger level Da is lower than a predetermined first average danger level Db, the autonomous mobile apparatus 1 moves closer to the home position the lower then average danger level Da is. Also, when the average danger level Da is equal to the first average danger level Db, the distance d is made the average distance La described above. Also, when the average danger level Da is between the first average danger level Db and a predetermined second danger level Dc that is higher than the first average danger level Db, the distance d rapidly becomes shorter as the average danger level Da increases. Incidentally, the distance d when the average danger level Da is equal to the second average danger level Dc is determined based on the area of visibility and the angle of visibility of the master B that are recognized by estimation by the camera 10 and the communication device 12 and the like. That is, the distance d in this case is obtained according to the expression $(h1-h2)/\tan \Theta$, where h1 is the visual field height of the master B, h2 is the height of the autonomous mobile apparatus 1, and $\Theta$ is the angle of visibility below a horizontal plane that lies at the visual field height of the master B within the angle of visibility in the vertical direction when the master B is facing directly forward. As a result, when the average danger level Da is lower than the second average danger level Dc, the autonomous mobile apparatus 1 is within the area of visibility of the master B when the master B is facing directly forward. Incidentally, the first average danger level Db functions as a first numerical value, and the second average danger level Dc functions as a second numerical value.

Also, when the average danger level Da is higher than the second average described Dc, the distance d gradually becomes shorter so as to approach a predetermined minimum approach distance dmin as the average described Da increases. At this time, the autonomous mobile apparatus 1 is outside of the area of visibility of the master B when the master B is facing directly forward. The minimum approach distance dmin refers to the minimum distance that the autonomous mobile apparatus 1 can come to the master B (i.e., the closest that the autonomous mobile apparatus 1 can get to the master B). In other words, this minimum approach distance dmin is the distance of the boundary between i) a distance at which the autonomous mobile apparatus 1 will not be in the way of the master B when the master B walks and the autonomous mobile apparatus B approaches the master B, and ii) the distance at which the autonomous mobile apparatus 1 will be in the way of the master B when the master B walks and the autonomous mobile apparatus B approaches the master B. Incidentally, the first average danger level Db, the second average danger level Dc, and the minimum approach distance dmin and the like may be input in advance to the autonomous mobile apparatus 1 from the input device 42 by the master, and may also be changed by the master.

Figure 6A:
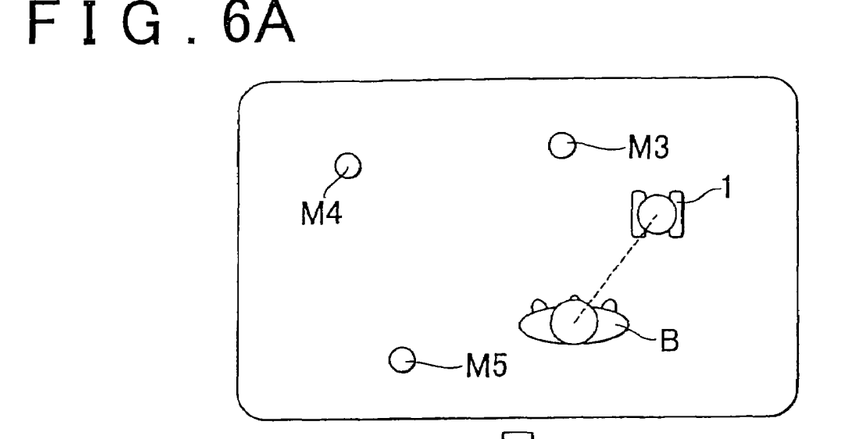
FIGS. 6A, 6B, and 6C are views showing a method for determining the relative direction of movement of the autonomous mobile apparatus according to the example embodiment with respect to the master.

Next, an example method for determining the relative direction of movement of the autonomous mobile apparatus 1 with respect to the master B will be described with reference to FIGS. 6A to 6C, 7A, and 7B. First, in this example, the autonomous mobile apparatus 1 is in the home position with respect to the master B who is moving or stationary, as shown in FIG. 6A. Also, there are three objects M3, M4, and M5, for example, near the master B. These objects are recognized by the camera 10 and the communication device 12 and the like. Also, the danger level for all of these objects M3, M4, and M5 detected by the danger level detecting portion 24 is $D_3$ (indicated by the circles), which is a relatively low level, so the autonomous mobile apparatus 1 is relatively close to the home position.

Figure 5:
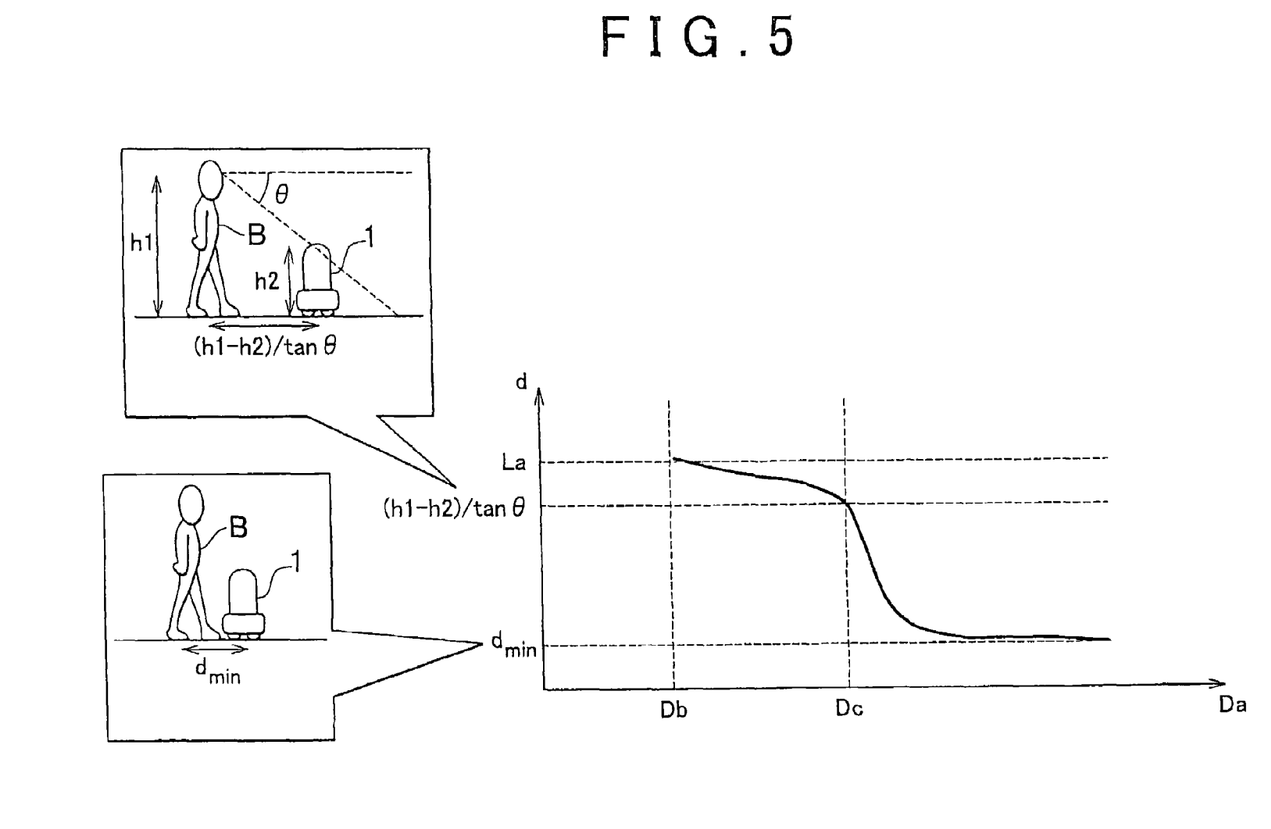
FIG. 5 is a graph showing a method for calculating the distance that the autonomous mobile apparatus maintains from the master according to the example embodiment.
Figure 6B:
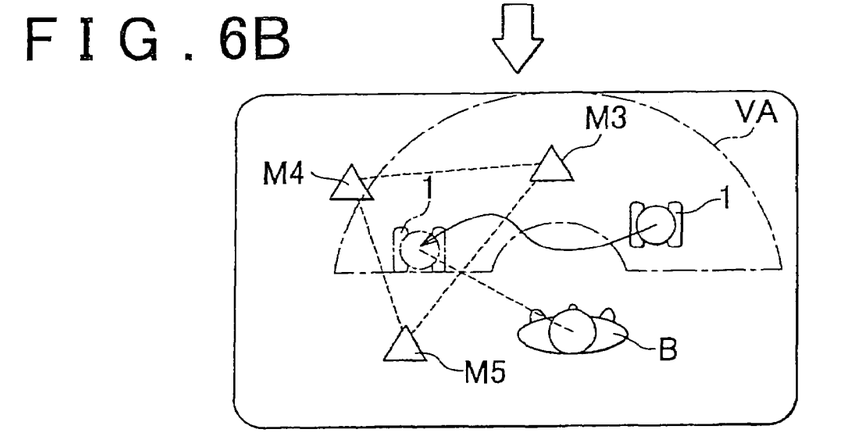

Then danger level of all of the objects M3, M4, and M5 increases to $D_4$ (indicated by the triangles), as shown in FIG. 6B. In this case, the danger location of each of the objects M3, M4, and M5 is predicted and the average danger location and the average danger level are calculated. Incidentally, when $D_4$, which is the calculated average danger level, is between the average danger levels Db and Dc shown in FIG. 5, the distance d corresponding to this average danger level D4 is calculated. Then the relative position between the average danger location and the master B, at which the distance to the master B is the distance d, is calculated and the autonomous mobile apparatus 1 moves to the calculated relative position with respect to the master B.

Incidentally, the position to which the autonomous mobile apparatus 1 moves is within an area of visibility VA of the master B when the master B is facing directly forward. Because the autonomous mobile apparatus 1 is within the area of visibility VA of the master B, the distance d between the autonomous mobile apparatus 1 and the master B is relatively long. Accordingly, the area within which the master B is able to move freely increases. As a result, the master B can move without being bothered by the autonomous mobile apparatus 1 being too close. Also, the master B can recognize when the danger level is becoming relatively high by the autonomous mobile apparatus 1 moving within the area of visibility VA of the master B. As a result, the master B can reduce the danger of getting into a more serious accident.

Figure 6C:
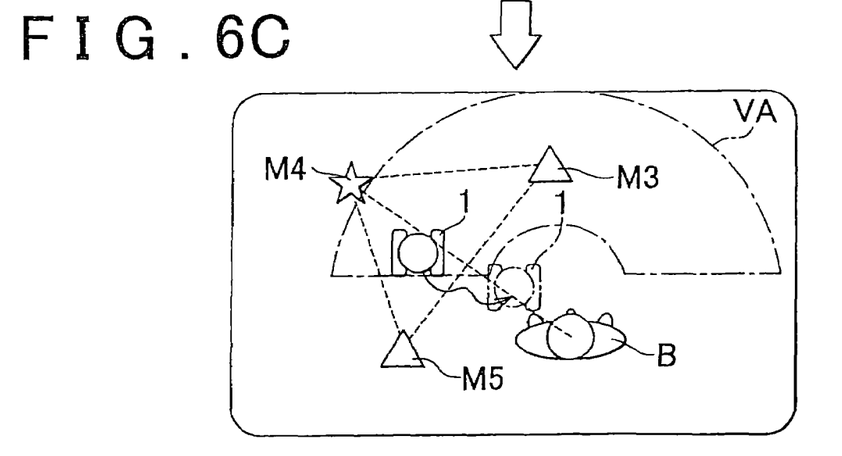

Also, if only the danger level of the object M4 further increases to $D_5$ (indicated by the star) as shown in FIG. 6C, the danger locations of all of the objects M3, M4, and M5 are predicted and the average danger location and the average danger level are calculated. Incidentally, when the calculated average danger level is higher than the second average danger level Dc shown in FIG. 5, the distance d corresponding to this average danger level is then calculated. This calculated distance d is shorter than it is in FIG. 6B. Then the relative position between the average danger location and the master B, at which the distance to the master B is the distance d, is calculated and the autonomous mobile apparatus 1 moves to the calculated relative position with respect to the master B. Incidentally, the position to which the autonomous mobile apparatus 1 moves is outside of the area of visibility VA of the master B when the master is facing directly forward.

Figure 7A:
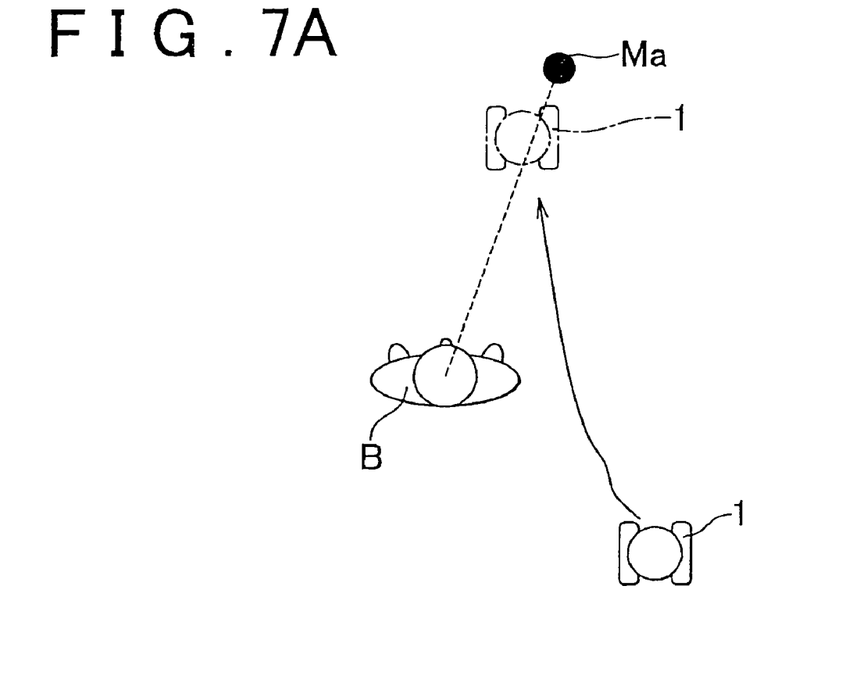
FIGS. 7A and 7B are views showing a method for determining the relative direction of movement of the autonomous mobile apparatus according to the example embodiment with respect to the master.
Figure 7B:
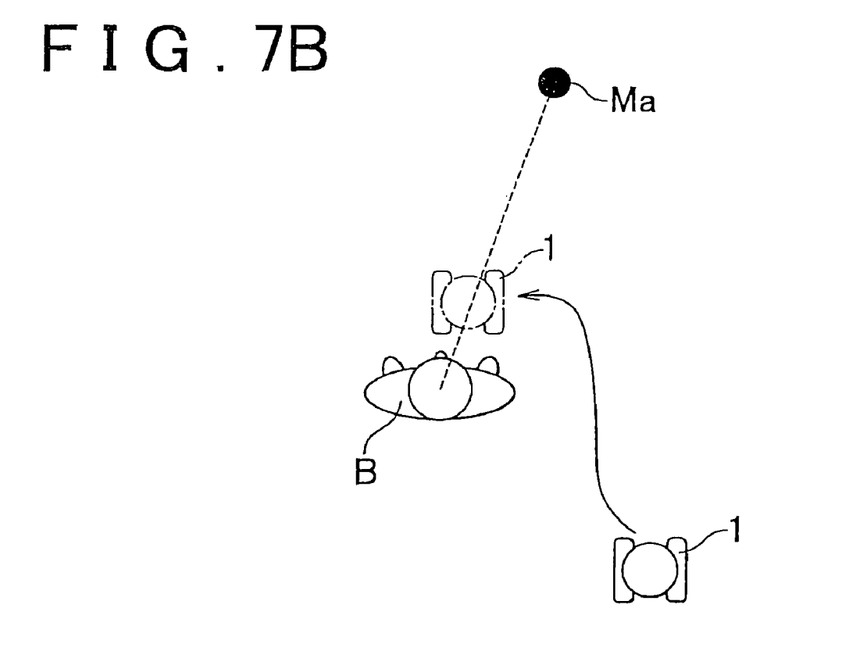

A case in which the average danger level has further increased will now be described in more detail. In this example, first the average danger level Da of a virtual object Ma is between the average danger levels Db and Dc shown in FIG. 5. In this case, as shown in FIG. 7A, the autonomous mobile apparatus 1 moves between the object M5 and the master B. In other words, the autonomous mobile apparatus 1 moves along a virtual line that connects the object M5 and the master B. Then if the average danger level Da increases so that it is higher than the second average danger level Dc shown in FIG. 5, the autonomous mobile apparatus 1 moves relatively close to the master B such that the distance d to the master B becomes shorter, as shown in FIG. 7B. As a result, the movement of the master B is impeded, making it possible to prevent an accident. Incidentally, this distance d is always longer than the minimum approach distance dmin. As a result, the autonomous mobile apparatus 1 is able to impede the movement of the master B while still being far enough away so as not to be in the way of the master B when the master B walks.

Figure 8:
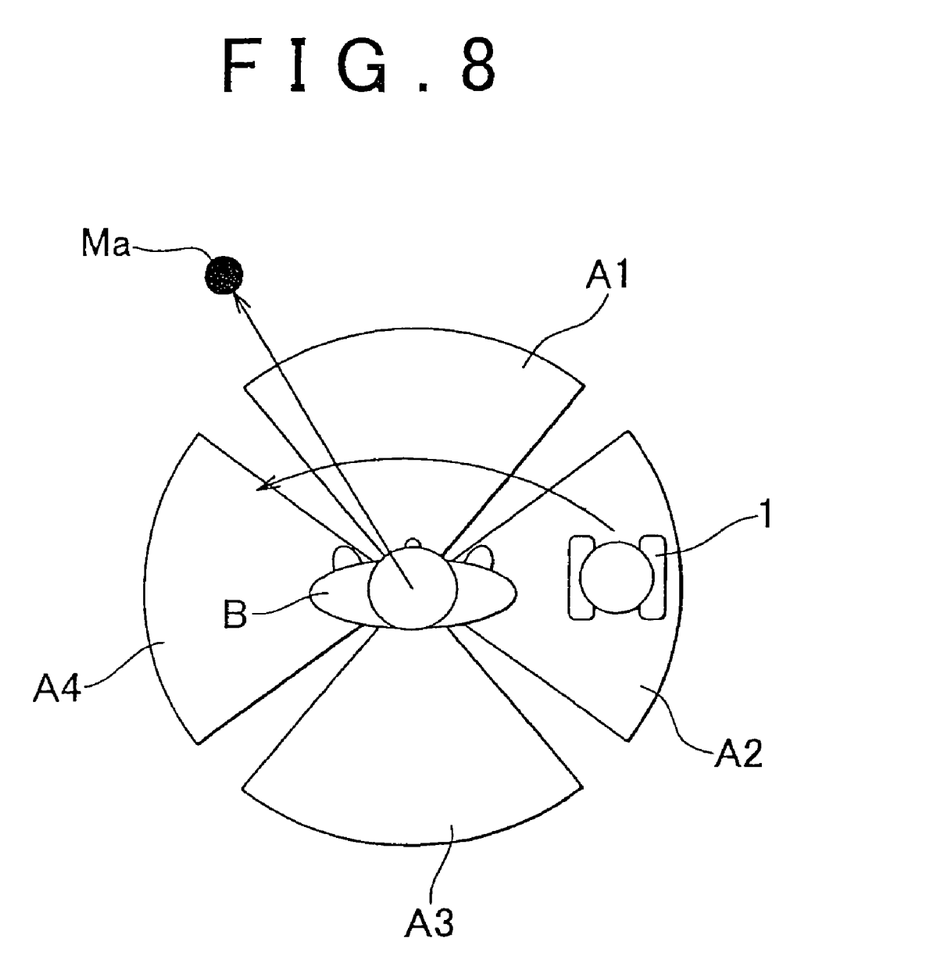
FIG. 8 is a view showing the areas within which a home position that is set in the autonomous mobile apparatus can be located according to the example embodiment.

An example of the area within which the home position set in the autonomous mobile apparatus 1 can be located will now be described with reference to FIGS. 8 and 9A to 9D. As shown in FIG. 8, there are, for example, four areas within which the home position can be located, i.e., a leading area A1, a right side area A2, a following area A3, and a left side area A4. Each of these areas A1 to A4 correspond to an area of a circle on a plane on which the autonomous mobile apparatus 1 moves and which is centered around the master B, which has been divided into four fan shaped areas, each of which has a center angle of approximately 90°. Incidentally, the leading area A1 is an area directly in front of the master B, the right side area A2 is an area to the right of the master B from the viewpoint of the master B (i.e., on the master's right), the following area A3 is an area directly behind the master B from the viewpoint of the master B, and the left side area A4 is an area to the left of the master B from the viewpoint of the master B (i.e., on the master's left).

The autonomous mobile apparatus 1 predicts the danger location and the danger level of each object, obtains the averages for each of these according to the methods described above, assumes that the virtual object Ma of the average danger level Da is in the average danger location, and autonomously moves accordingly. At this time, the autonomous mobile apparatus 1 changes its relative position with respect to the master B according to the average danger level Da. For example, when the average danger level Da is lower than a predetermined danger level, the autonomous mobile apparatus 1 moves within the area that includes the set home position. Incidentally, the autonomous mobile apparatus 1 may change between the left and right side areas, i.e., move from the right side area A2 to the left side area A4 or vice versa.

Figure 9A:
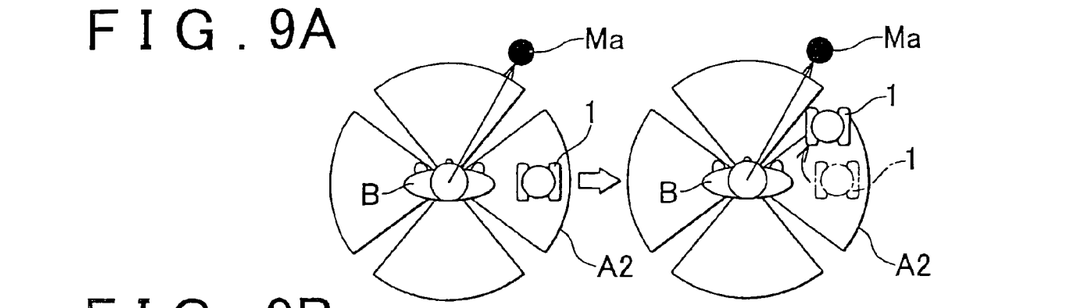
FIGS. 9A, 9B, 9C, and 9D are views showing the movement of the autonomous mobile apparatus according to the example embodiment.
Figure 9B:
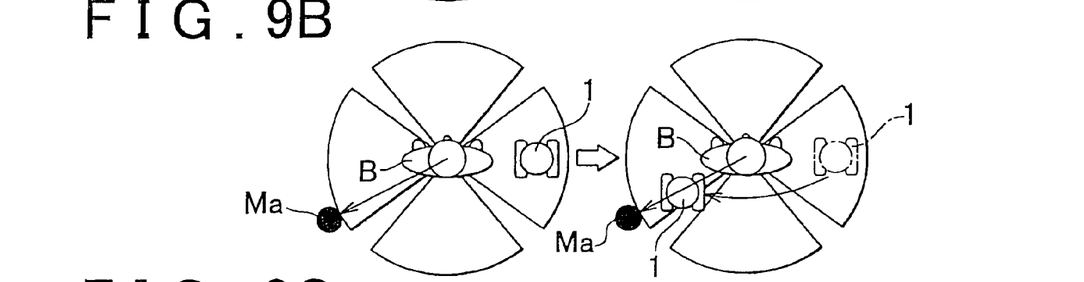
Figure 9C:
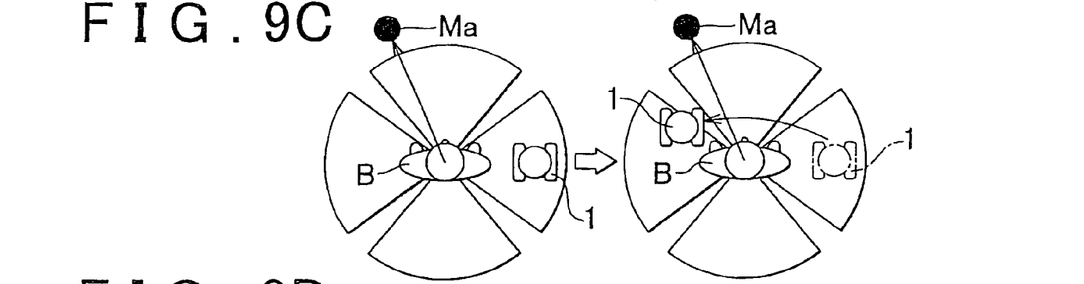
Figure 9D:
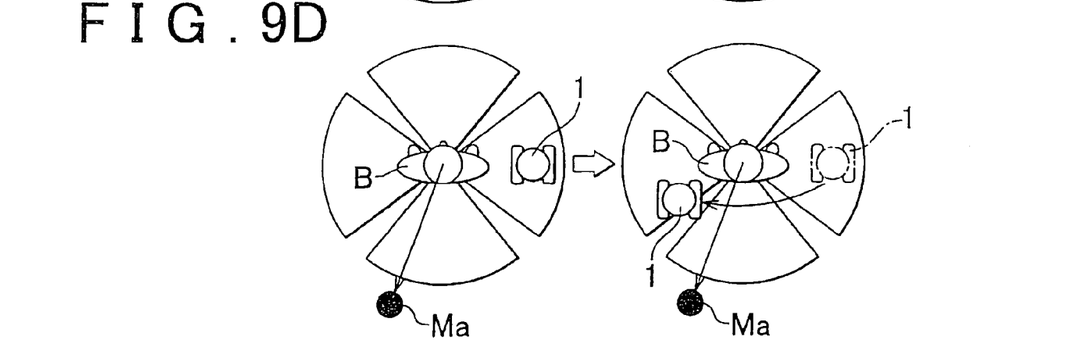

More specifically, as shown in FIG. 9A, when a virtual object Ma to the right front of the master B is recognized, the autonomous mobile apparatus 1 moves within the right side area A2 that includes the home position without moving to another area from the right side area A2. Also, as shown in FIG. 9B, when a virtual object Ma to the rear left of the master B is recognized, the autonomous mobile apparatus 1 moves from the right side area A2 that includes the home position to the rear in the left side area A4. Moreover, as shown in FIG. 9C, when a virtual object Ma to the left front of the master B is recognized, the autonomous mobile apparatus 1 moves from the right side area A2 that includes the home position to the front of the left side area A4. Further, as shown in FIG. 9D, when a virtual object Ma behind the master B is recognized, the autonomous mobile apparatus 1 moves from the right side area A2 that includes the home position to the rear of the left side area A4.

Figure 10A:
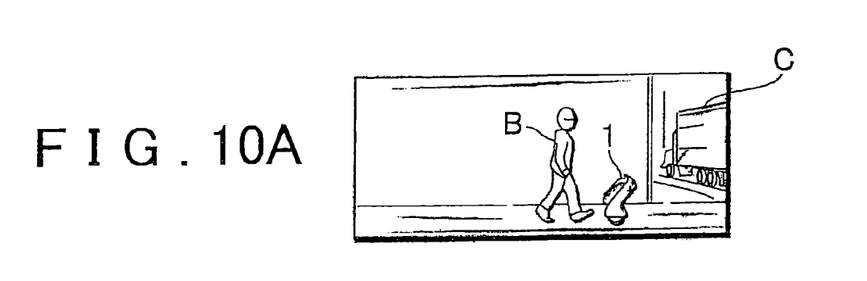
FIGS. 10A, 10B, 10C, and 10D are views of specific scenarios in which the autonomous mobile apparatus moves along with a master.

Next, specific scenarios in which the autonomous mobile apparatus 1 moves with the master B will be described with reference to FIGS. 10A to 10D. First, as shown in FIG. 10A, when there is a traveling vehicle C in front of the master B who is walking, the autonomous mobile apparatus 1 detects the danger level of the vehicle C and moves so as to always be in front of the master B. As the master C approaches the vehicle C, the autonomous mobile apparatus 1 slows down and moves relatively close to the master B. Accordingly, the autonomous mobile apparatus 1 can adjust the walking speed of the master B by forcing the master B to slow down. As a result, the autonomous mobile apparatus 1 draws the attention of the master B as well as prevents a traffic accident such as a collision between the master B and the vehicle C.

Figure 10B:
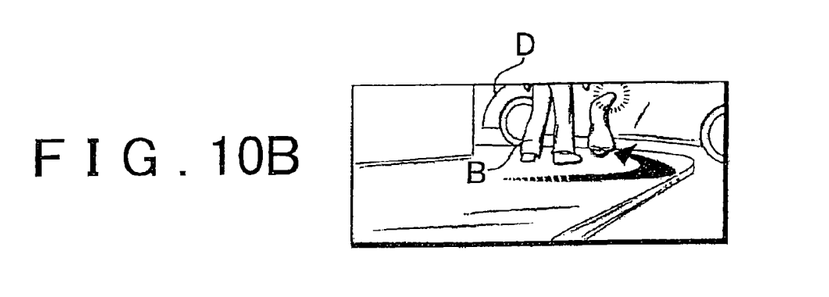

Also, as shown in FIG. 10B, when the master B who is walking is about to walk from a sidewalk into a street on which a vehicle D is traveling, the autonomous mobile apparatus 1 detects the danger level of the vehicle D and moves between the vehicle D and the master B. As a result, even if in doing so the autonomous mobile apparatus 1 comes into contact with the master B, it is able to prevent the master B from walking out into the street on which the vehicle D is traveling, thereby preventing a possible traffic accident such as a collision between the master B and the vehicle D that is traveling on the street. Incidentally, at this time, the autonomous mobile apparatus 1 may alert the master B and others in the vicinity by, for example, issuing a warning sound from the speaker 30 and flashing the back light 32, while moving.

Figure 10C:
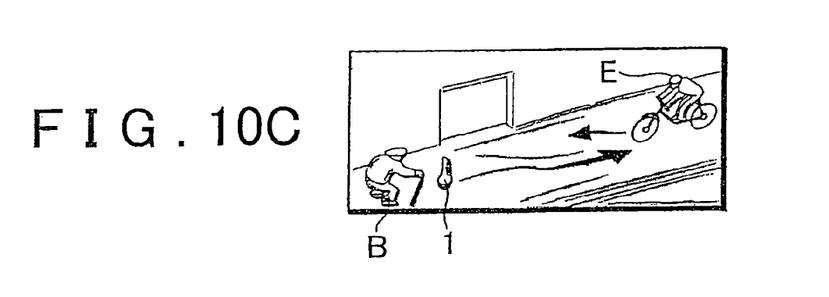

Also, as shown in FIG. 10C, when there is a moving obstacle E such as a bicycle traveling toward the master B from the direction in which the master B is walking, the autonomous mobile apparatus 1 detects the danger level of the moving obstacle E and moves toward the moving obstacle E along a virtual line that connects the master B and the moving obstacle E. Accordingly, the autonomous mobile apparatus 1 urges the moving obstacle E to change course. Incidentally, even if in doing so the autonomous mobile apparatus 1 comes into contact with the moving obstacle E, it is still able to guide the master B while preventing a traffic accident such as contact or a collision between the master B and the moving obstacle E.

Figure 10D:
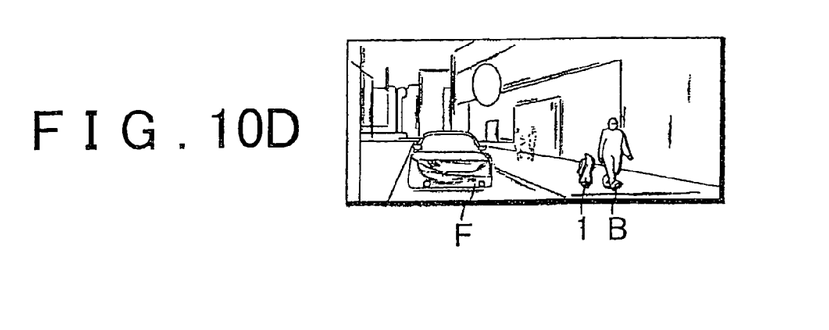

Also, as shown in FIG. 10D, the autonomous mobile apparatus 1 detects the danger level of moving objects, including a vehicle F traveling on a street next to the master B who is walking, and moves so as to always be positioned between the master B and the street. That is, the autonomous mobile apparatus 1 travels on the side of the master B where the danger level is detected, such as the street side of the master B. As a result, it is possible to prevent the master B from sticking out into the street where the vehicle F is traveling, as well as from carelessly attempting to cross the street, thus preventing a collision between the master B and the vehicle F that is traveling on the street.

According to the autonomous mobile apparatus 1, when there is an object M4 in the surrounding environment that is recognized by the camera 10 and the communication device 12 and the like while the autonomous mobile apparatus 1 is autonomously moving along near the master B, as shown in FIG. 6B, the danger level detecting portion 24 detects the danger level of the object M4 to the master B and the actuator controlling portion 26 and the electric motor 34 move the autonomous mobile apparatus 1 based on this danger level.

The danger level of the object indicates the extent to which the master B would be harmed if the master B were to contact the object. The autonomous mobile apparatus 1 takes this danger level into account and moves so as to physically ensure the safety of the master B, thereby preventing a traffic accident or the like. Incidentally, there may be times when the master B may not notice only a warning message displayed on the display or only a warning sound from the speaker but having the autonomous mobile apparatus 1 move based on the danger level is quite effective for physically preventing the master B from entering (i.e., walking into) a dangerous area.

Also, when there is an object M4 in the surrounding environment recognized by the camera 10 and the communication device 12, the actuator controlling portion 26 and the electric motor 34 move the autonomous mobile apparatus 1 based on the danger location predicted by the danger location predicting portion 22. This danger location is an area where a traffic accident or the like is likely to occur. The autonomous mobile apparatus 1 takes this danger location into account and moves to prevent the master B from entering (i.e., walking into) the dangerous area, thereby more reliably ensuring the safety of the master B. As a result, a traffic accident or the like can more reliably be prevented.

Also, the actuator controlling portion 26 and the electric motor 34 move the autonomous mobile apparatus 1 based on the average danger location predicted by the danger location predicting portion 22 and the average danger level of the object detected by the danger level detecting portion 24. Therefore, the autonomous mobile apparatus 1 can move to ensure the safety of the master B, taking into account the average danger location and the average danger level of all of the objects around the master B. As a result, the safety of the master B can be ensured with only one autonomous mobile apparatus 1.

Also, the actuator controlling portion 26 and the electric motor 34 move the autonomous mobile apparatus 1 based on the relative position to the master B, which is set (i.e., input) in advance as the home position using the input device 42. Accordingly, the autonomous mobile apparatus 1 autonomously moves along near the master B while maintaining the relative position set in advance by the master B as the home position. As a result, the autonomous mobile apparatus 1 can move so as to ensure the safety of the master B while improving user-friendliness by being in a relative area that is preferred by the master B.

Furthermore, the actuator controlling portion 26 and the electric motor 34 move the autonomous mobile apparatus 1 closer to the home position as the danger level of the object decreases. Accordingly, when the danger level of an object to the master B is relatively low, the safety of the master B can be ensured by warning the master B by only displaying a warning message using the display 44, only issuing a warning sound using the speaker 30, or only giving a warning using a haptic (i.e., tactual such as vibrating) device, not shown. Also, the autonomous mobile apparatus 1 moves along in the home position so the master B is able to move relatively freely and thus able to enjoy the benefits of both convenience and comfort.

Similarly, the actuator controlling portion 26 and the electric motor 34 move the autonomous mobile apparatus 1 to increase the distance that it can move from the home position as the danger level of an object increases. Accordingly, when the danger level to the master B is higher, the autonomous mobile apparatus 1 can also move along in a position that is farther away from the relative position set as the home position by the master B.

Also, the actuator controlling portion 26 and the electric motor 34 move the autonomous mobile apparatus 1 based on the area of visibility and the angle of visibility $\Theta$ of the master B, and the danger level of an object to the master B, such as the average danger level Da, as shown in FIG. 5. More specifically, when the average danger level Da is between the first average danger level Db and the second average danger level Dc, the autonomous mobile apparatus 1 moves along at a predetermined distance or more from the master B, but when the average danger level Da is higher than the second average danger level Dc, the autonomous mobile apparatus 1 moves along within a predetermined distance from the master B (i.e., moves along while being less than a predetermined distance away from the master B). Accordingly, the autonomous mobile apparatus 1 is able to move to ensure the safety of the master B.

Moreover, when the average danger level Da is between the first average danger level Db and the second average danger level Dc, as shown in FIG. 6B, the actuator controlling portion 26 and the electric motor 34 move the autonomous mobile apparatus 1 between the master B and the virtual object of the average danger level Da. In other words, the autonomous mobile apparatus 1 moves along a virtual line that connects the virtual object and the master B. Therefore, the autonomous mobile apparatus 1 can ensure the safety of the master B by preventing an object around the master B from coming in contact with the master B. Also, by moving in advance to the position where contact between the master B and a nearby object is highly likely to occur, the autonomous mobile apparatus 1 is able to prevent an accident that may otherwise occur if the autonomous mobile apparatus 1 is not able to move to that position fast enough.

Also, the danger level detecting portion 24 detects the danger level based on the estimated time to contact between the object and the master B, which recognized by the camera 10 and the communication device 12. The danger level detecting portion 24 may also detect a proportionately higher danger level as the estimated time to contact between the object and the master B becomes shorter, for example. As a result, the danger level of a dangerous area in the direction in which the master B is advancing can be weighted more heavily so a traffic accident such as contact between the master B and the object can be more reliably prevented even if an accident (i.e., contact) is about to occur soon.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. An autonomous mobile apparatus that moves autonomously along near a specified person, comprising:
    surrounding environment recognizing portion that recognizes the specified person and a surrounding environment of the specified person;
    danger level detecting portion that, when there is an object in the surrounding environment recognized by the surrounding environment recognizing portion, predicts a danger level of the object with respect to the specified person; and
    moving portion that moves the autonomous mobile apparatus based on the danger level detected by the danger level detecting portion,
    wherein the moving portion moves the autonomous mobile apparatus between the specified person and an object for which the danger level detected by the detecting portion is higher than a predetermined danger level.

2. The autonomous mobile apparatus according to claim 1, further comprising:
    danger location predicting portion that, when there is an object in the surrounding environment recognized by the surrounding environment recognizing portion, predicts a danger location where there is a possibility of the object and the specified person coming into contact with one another,
    wherein the moving portion moves the autonomous mobile apparatus based on the danger level and the danger location predicted by the danger location predicting portion.

3. The autonomous mobile apparatus according to claim 2, further comprising:
    averaging portion that calculates an average of the danger location and an average of the danger level of the object,
    wherein the moving portion moves the autonomous mobile apparatus based on the average of the danger location and the average of the danger level.

4. The autonomous mobile apparatus according to claim 3, wherein the average of the danger location is a weighted average of the danger location, in which the danger level is the weight.

5. The autonomous mobile apparatus according to claim 3, wherein when there are a plurality of objects in the surrounding environment recognized by the surrounding environment recognizing portion, the averaging portion calculates the average of the danger location based on the danger level of each of the plurality of objects and the danger location of each of the plurality of objects.

6. The autonomous mobile apparatus according to claim 1, wherein the moving portion moves the autonomous mobile apparatus based on a relative position of the autonomous mobile apparatus with respect to the specified person, the relative position being set in advance as a home position.

7. The autonomous mobile apparatus according to claim 6, wherein the moving portion moves the autonomous mobile apparatus closer to the home position the lower the danger level of the object detected by the danger level detecting portion is.

8. The autonomous mobile apparatus according to claim 1, wherein the surrounding environment recognizing portion recognizes by estimation the area of visibility of the specified person; and the moving portion moves the autonomous mobile apparatus based on the area of visibility of the specified person recognized by the surrounding environment recognizing portion and the danger level of the object with respect to the specified person, which is detected by the danger level detecting portion.

9. The autonomous mobile apparatus according to claim 1, wherein the surrounding environment recognizing portion recognizes by estimation the time to contact between the object and the specified person; and the danger level detecting portion detects the danger level based on the time to contact recognized by the surrounding environment recognizing portion.

10. The autonomous mobile apparatus according to claim 2, wherein the moving portion moves the autonomous mobile apparatus along a virtual line that connects the specified person with the average of the danger location when the average of the danger level is equal to or greater than a preset first numerical value.

11. The autonomous mobile apparatus according to claim 2, wherein the moving portion i) moves the autonomous mobile apparatus closer to a relative position of the autonomous mobile apparatus with respect to the specified person, the relative position being set in advance as a home position the lower the average of the danger level is when the average of the danger level is less than the preset first numerical value, ii) moves the autonomous mobile apparatus within the area of visibility of the specified person, along the virtual line that connects the specified person with the average of the danger location when the average of the danger level is equal to or greater than the preset first numerical value but less than a second numerical value that is set larger than the first numerical value in advance, and iii) moves the autonomous mobile apparatus closer to the specified person than the area of visibility of the specified person when the average of the danger level is equal to or greater than the second numerical value.

12. The autonomous mobile apparatus according to claim 1, wherein the surrounding environment recognizing portion includes a camera that captures an image of the specified person and the surrounding environment of the specified person, and recognizes the specified person and the surrounding environment of the specified person based on the captured image; and the danger level detecting portion detects the danger level of the object based on the captured image.

13. The autonomous mobile apparatus according to claim 12, wherein the danger location predicting portion predicts the danger location where there is a possibility of the object and the specified person coming into contact with one another, based on the captured image.

14. A method of mobility of an autonomous mobile apparatus that moves autonomously along near a specified person, comprising:
 recognizing the specified person and a surrounding environment of the specified person;
 detecting, when there are a plurality of objects in the recognized surrounding environment, a danger level of each of the plurality of objects with respect to the specified person;
 predicting a danger location where there is a possibility of each of the plurality of objects and the specified person coming into contact with one another;
 moving based on the danger levels and the danger locations; and
 moving between the specified person and an object having its danger level higher than a predetermined danger level.

15. The method of mobility of the autonomous mobile apparatus according to claim 14, further comprising:
 moving based on a weighted average of the danger location, in which the danger level is the weight.

* * * * *